(12) United States Patent
Slesinski et al.

(10) Patent No.: US 10,626,972 B2
(45) Date of Patent: Apr. 21, 2020

(54) INPUT GEAR SET FOR MOUNTING TO AN AXLE ASSEMBLY HOUSING

(71) Applicant: Dana Heavy Vehicle Systems Group, LLC, Maumee, OH (US)

(72) Inventors: Steven G. Slesinski, Ann Arbor, MI (US); Harry W. Trost, Royal Oak, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 230 days.

(21) Appl. No.: 15/704,411

(22) Filed: Sep. 14, 2017

(65) Prior Publication Data

US 2019/0078675 A1    Mar. 14, 2019

(51) Int. Cl.
| | |
|---|---|
| F16H 48/08 | (2006.01) |
| F16H 48/38 | (2012.01) |
| F16H 48/10 | (2012.01) |
| F16H 57/037 | (2012.01) |
| B60K 1/00 | (2006.01) |
| F16H 48/42 | (2012.01) |
| B60K 17/08 | (2006.01) |
| B60K 17/16 | (2006.01) |

(52) U.S. Cl.
CPC ............... *F16H 48/08* (2013.01); *B60K 1/00* (2013.01); *B60K 17/08* (2013.01); *B60K 17/16* (2013.01); *F16H 48/10* (2013.01); *F16H 48/38* (2013.01); *F16H 48/42* (2013.01); *F16H 57/037* (2013.01); *B60K 2001/001* (2013.01); *B60Y 2400/73* (2013.01); *B60Y 2400/80* (2013.01); *F16H 2048/382* (2013.01); *F16H 2200/0021* (2013.01)

(58) Field of Classification Search
CPC .................................................... F16H 57/037
See application file for complete search history.

(56) References Cited

U.S. PATENT DOCUMENTS

| | | | |
|---|---|---|---|
| 5,083,993 A | 1/1992 | Oun | |
| 5,704,443 A | 1/1998 | Janiszewski | |
| 5,836,848 A | 11/1998 | Janiszewski et al. | |
| 6,896,638 B2 | 5/2005 | Nilsson | |
| 6,916,266 B2 | 7/2005 | Buhrke | |
| 7,559,390 B2 * | 7/2009 | Marsh | B60K 6/26 180/65.6 |
| 8,672,068 B2 | 3/2014 | Janson | |
| 9,193,252 B2 | 11/2015 | Tuckfield et al. | |

* cited by examiner

*Primary Examiner* — Derek D Knight
(74) *Attorney, Agent, or Firm* — McCoy Russell LLP

(57) ABSTRACT

A gear box having a gear set therein for mounting to the outside of a housing of an axle assembly and connected to the input shaft of the differential of the axle assembly can allow high speed electric motor(s) to connect to the differential via the gear box for driving the axle assembly. The gear box can be mounted using existing bolt hole pattern on the axle assembly housing such as the input cover of the axle head assembly housing the differential. The gear set can be a planetary gear set where the rotor of the electric motor can be rotationally connected to the sun gear and the carrier gear can be connected to the input pinion shaft. In another embodiment an axle assembly having a differential can also have a gear box mounted to the outside of the axle housing and connected to the input pinion shaft to allow use of a high speed electric motor by providing an appropriate gear ratio conversion.

18 Claims, 5 Drawing Sheets

INPUT GEAR SET FOR MOUNTING TO AN AXLE ASSEMBLY HOUSING

BACKGROUND

The present disclosure relates to axle assemblies. In particular, the axle assemblies can have planetary gear sets and more particularly the axle assembly can have a planetary gear set at the input shaft. Specifically, the axle assembly presently disclosed can have an input planetary gear set driven by an electric motor and/or an internal combustion engine for connection to a differential of an axle assembly. The planetary gear set can be packaged for addition outside the housing of the axle assembly for modifying or adapting existing axle assembly having a differential for use with electric power and hybrid systems.

Typically, vehicle axles assemblies are used to transmit power from the engine to the wheels and in many cases to regulate torque from the drive shaft to the wheels such as by regulating the rotational speed of output shafts relative to the rotational speed of the input shaft. Axle assemblies can come in many configurations depending on their use. There are front axle assemblies, rear axle assemblies and tandem axle assemblies. Tandem axles can include a driven axle and secondary dead axle such as a tag axle or pusher axle.

Modern axle assemblies can include an axle housing. The axle housing can have a head assembly portion that houses a differential gear assembly and at least a portion of the input pinion shaft. The head assembly portion of the axle housing can also at least partially house two semi-axles extending from the differential and extending to the left and right wheels. The head assembly can include at least. The differential gear assembly can utilize a planetary gear set or bevel gear set. Most modern axle assemblies for medium to heavy duty or commercial vehicles are designed for use with internal combustion engines which do not require high gear ratios. Typical gear ratio for such axle assemblies having a differential range from about 2.69:1 to as high as about 7.17:1, with many ratios in between.

There is an increasing trend to add electric motors to vehicles to improve performance and fuel efficiency. These hybrid powered systems require specialized or alternative axle assemblies to accommodate smaller higher speed electric motors which require much higher gear ratios. Alternatively, current lower gear ratio axle assemblies can be used with electric motors as long as the electric motor is fairly large work well with the lower gear ratio, i.e. 7.17:1, axle assemblies. For smaller electric motors, alternative axle assemblies providing higher gear ratios such as from about 20:1 to about 80:1 must be used which requires a significant design change. Adapting current low gear ratio axle assemblies for use in hybrid systems without having to take apart or access components internal to the axle assembly housing would allow more vehicles to accommodate electric motors.

The presently disclosed axle assemblies for use with hybrid electric power system and methods of adapting axle assemblies for use with hybrid electric power utilize axle assemblies designed for use with internal combustion engines to also allow use with hybrid electric vehicles with requiring access inside the axle housing. The present disclosure also provides a planetary gear assembly for connection to the outside of the axle assembly housing to adapt the axle assembly for use with hybrid electric powered vehicles.

SUMMARY

In one embodiment of the present disclosure a gear box can be mounted to the outside of a housing of an axle assembly and specifically to the head assembly portion of the axle housing that contains the differential to transfer rotational power from a high speed electric motor to the input pinion shaft. The gear box can be attached to the head assembly portion by using existing bolt hole pattern of the head assembly portion such as an input cover bolt hole pattern or existing bolt hole pattern provided on the head assembly portion for attachment of a bearing cage, a parking brake or a retarder. The gear box can have a gear set therein. The gear set can have a planetary gear set or a bevel gear set. The planetary gear set can have a group of interconnected gears. In particular, the planetary gear set can have a central sun gear engaged to planet gears positioned around the sun gear. A ring gear can surround and be engaged to the planet gears. A carrier gear can connect to all the planet gears for rotation with the revolution of the planet gears about the sun gear. The planetary gear set can have two or more planet gears, and preferably three or more and in one embodiment can have four planet gears. In one embodiment, the rotor or drive shaft of the electric motor is rotationally connected to the sun gear at one side of the planetary gear set and the carrier gear connected to the input pinion shaft at the opposite side of the planetary gear set.

In another embodiment of the present disclosure, an axle assembly can have a gear box housing a gear set mounted or attached to the outside of an axle assembly housing at the position of the differential of the axle assembly for converting the gear ratio of the axle assembly for use with a high speed electric motor. The gear box can be attached to the housing of the axle assembly by using existing bolt hole pattern such as an input cover bolt hole pattern or existing bolt hole pattern provided on the axle assembly housing for attachment of a bearing cage, a parking brake or a retarder. The gear box can have a gear set therein. The gear set can have a planetary gear set or a bevel gear set. The planetary gear set can have a group of interconnected gears. In particular, the planetary gear set can have a central sun gear engaged to planet gears positioned around the sun gear. A ring gear can surround and be engaged to the planet gears. A carrier gear can connect to all the planet gears for rotation with the revolution of the planet gears about the sun gear. The planetary gear set can have two or more planet gears, and preferably three or more and in one embodiment can have four planet gears. In one embodiment, the rotor or drive shaft of the electric motor is rotationally connected to the sun gear at one side of the planetary gear set and the carrier gear connected to the input pinion shaft at the opposite side of the planetary gear set.

DETAILED DESCRIPTION

It is to be understood that the invention may assume various alternative components, orientations and configurations, except where expressly specified to the contrary. It is also understood that the specific devices and processes illustrated in the attached drawings, and described in the specification are simply exemplary embodiments of the inventive concepts disclosed and defined herein. Therefore, specific dimensions, directions or other physical characteristics relating to the various embodiments disclosed are not to be considered as limiting, unless expressly stated otherwise.

Figure 1:
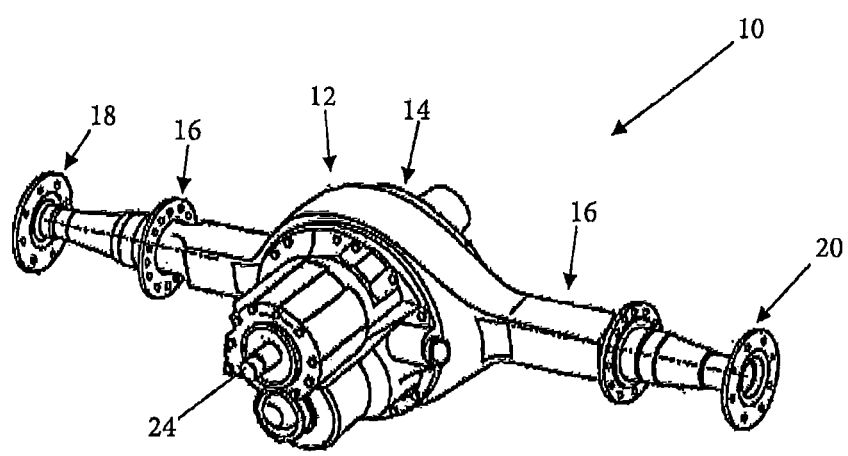
FIG. 1 is a perspective view of an axle assembly.

A typical commercial vehicle drive axle assembly 10 is shown on FIG. 1. The axle assembly 10 can be part of a tandem axle. Axle assembly 10 can be the dead axle of a tandem axle which can be adapted according to the present disclosure to provide additional drive with an electric motor or can be a drive axle initially designed for gas engine use and adapted for use with an electric motor in addition to the engine or instead of the engine. Axle housing 12 can have head assembly portion 14 and wheel axle portions 16. Axle head assembly portion 14 can house the differential 15 and in some embodiments at least portions of the wheel axles. Wheel axle portions 16 can house the ends of a single axle extending from one wheel end 18 to the opposite wheel end 20 and passing through the differential 15, or two semi wheel axles, one extending from one side of the differential 15 to wheel end 18 and another one extending from the opposite side of the differential to wheel end 20. Head assembly portion can also house at least a portion of input pinion shaft 24 of differential 15 shown in FIGS. 1 and 2.

Commercial vehicle drive axles such as axle 10 of FIG. 1 usually provide a fairly narrow range of gear ratios. For example common gear ratio for commercial vehicle axles can be somewhere around 7:1. The ratios can be as low as 4:1 and as high as 10:1. Electric motors can be used with such axle but typically only very large electric motors that can operate with such low gear ratios. Smaller or more cost effective electric motors for vehicles usually operate at higher speeds, such as in excess of 10,000 or even 16,000 rpms. In order to incorporate such electric motors with existing commercial vehicle axle assemblies, the gear ratio of commercial drive axles will require conversion, alteration or redesign.

The present disclosure provides gears sets for connection to the input of the differential and mountable to the outside of the axle housing that convert and specifically raise the gear ratio of the drive axle assembly allowing use of smaller, cost effective and/or higher speed vehicular electric motors. The present disclosure also provides drive axles that have a planetary gear set mounted to the outside of the axle housing and connected to the input pinion shaft of the differential for use with electric motor power with having to redesign differential or other internal gear sets.

Figure 2:
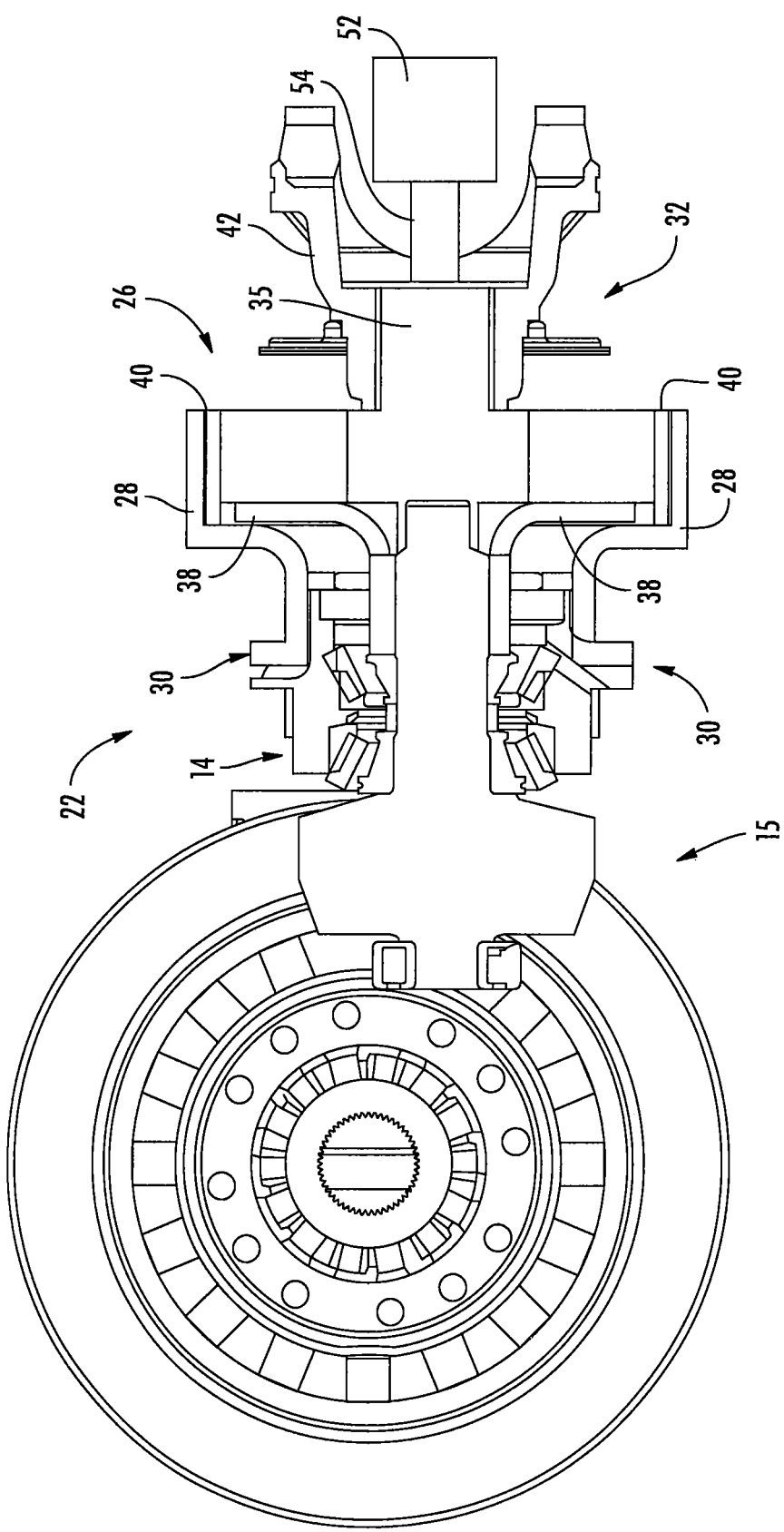
FIG. 2 is a cross-sectional view of the head assembly of an axle assembly having a gear box mounted to the outside of the housing of the head assembly according to the present disclosure.

In one embodiment as shown in FIG. 2, a gear box 22 is shown mounted to the outside of axle head assembly portion 14. Gear box 22 can have a gear set 26 contained in housing 28. Housing 28 can have attachment members 30 for mounting the gear box 22 to the outside of axle head assembly portion 14. Attachment members 30 can be positioned on the gear box housing 28 to align with two or more bolt holes of an existing bolt hole pattern of the head assembly portion 14 of axle housing 12.

Figure 4:
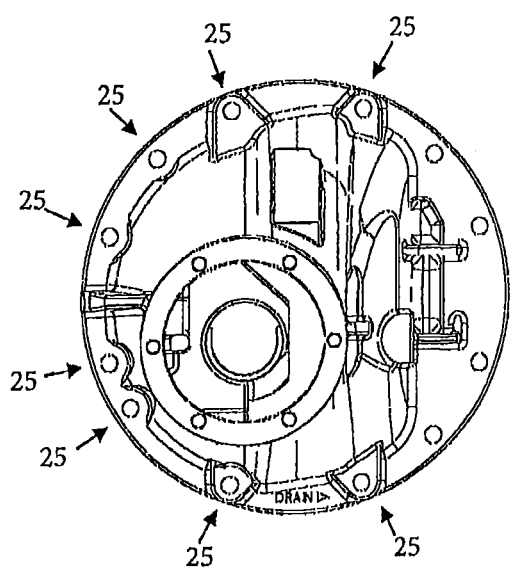
FIG. 4 is an elevation view of a input cover of an axle head housing showing bolt holes for attaching or mounting a gear box according to the present disclosure.
Figure 5:
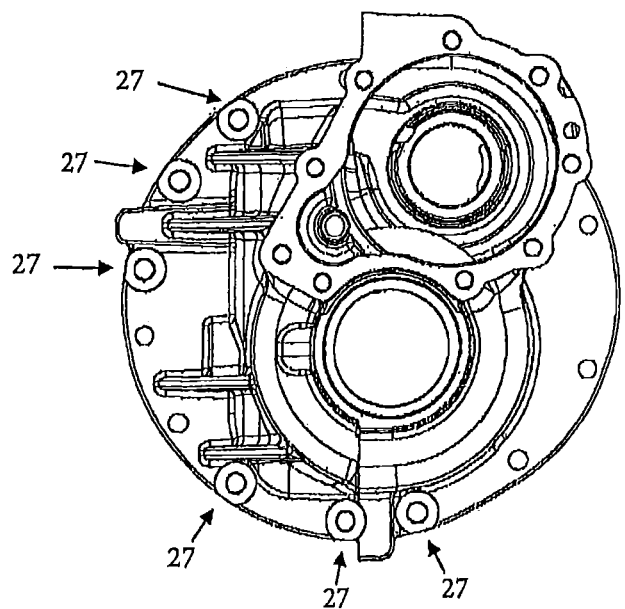
FIG. 5 is an elevation view of a bearing cage attachment area of an axle head housing showing bolt holes for attaching or mounting a gear box according to the present disclosure.
Figure 6:
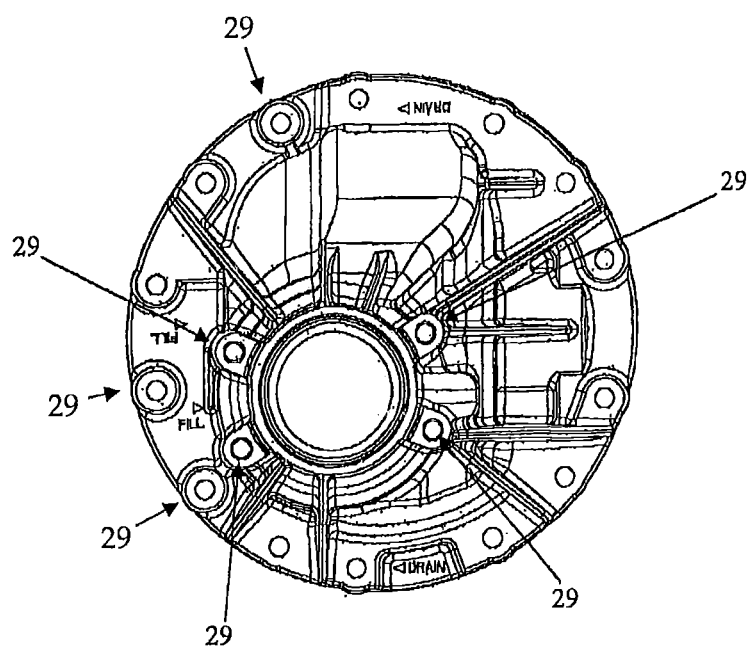
FIG. 6 is an elevation view of a parking brake attachment area of an axle head housing showing bolt holes for attaching or mounting a gear box according to the present disclosure.
Figure 7:
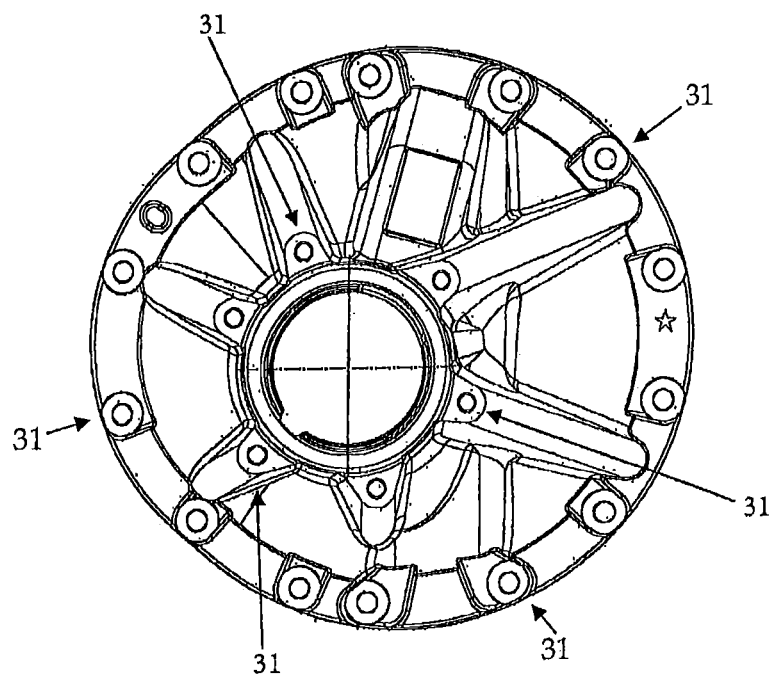
FIG. 7 is an elevation view of a retarder attachment area of an axle head housing showing bolt holes for attaching or mounting a gear box according to the present disclosure.

In one embodiment, attachment members 30 can be position to align with two or more input cover bolt holes 25 as shown in FIG. 4 or two or more of existing bolt holes 27 for an input cage of a tandem axle as shown in FIG. 5. In another embodiment, attachment members 30 can be positioned to align with two or more holes 29 of an integrated parking brake as shown in FIG. 6, or with two or more holes 31 of retarder attachment area as shown in FIG. 7. In another embodiment gear box 22 can be attached or mounted to the outside of axle head assembly 14 of the axle housing 12 by welding attachment members 30 to the housing or by utilizing clamps or straps.

In one embodiment, gear set 26 can be a planetary gear set. The planetary gear set can be selected to provide the desired gear reduction for specific electric motor to be used. In one embodiment, the planetary gear set can provide from about a 10:1 to about 70:1 gear ratio to arrive at an overall gear ratio for the drive axle 10 of from about a 2:1 to about 40:1. In another embodiment the gear set 26 can provide a gear ratio of from about 20:1 to about 40:1 and an overall ration with differential 15 of about 7:1 to 25:1.

Figure 3:
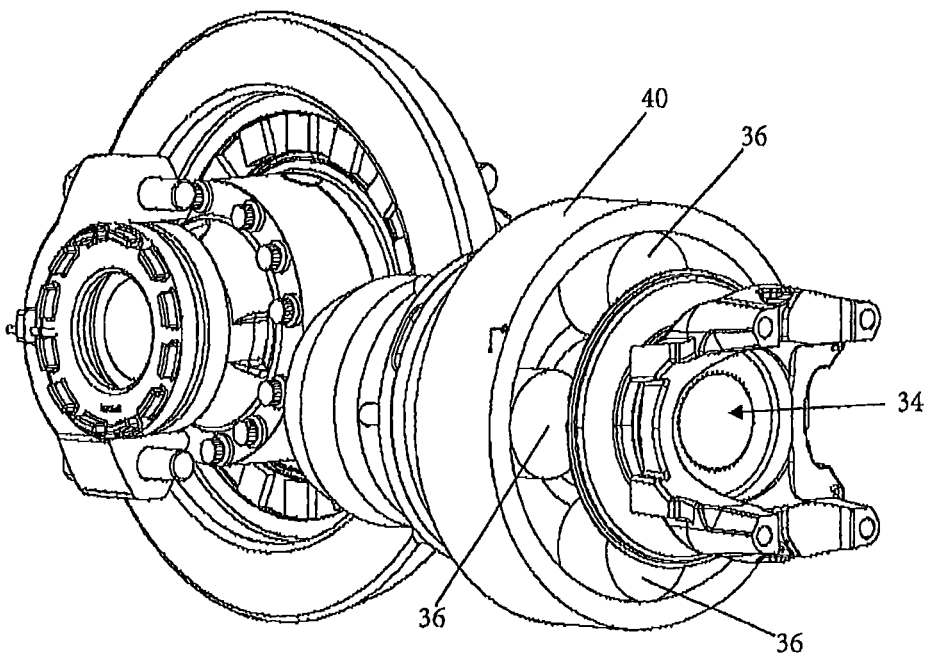
FIG. 3 is a perspective view of one embodiment of planetary gear set of the gear box according to the present disclosure connected to an input pinion shaft of an axle assembly.

One embodiment of planetary gear set is shown in FIGS. 2 and 3. Planetary gear set 32 can have centrally located sun gear 34, planet gears 36, preferably four gears (only three shown) engaged with the sun gear 34, a planetary carrier 38 connected to the planet gears 38 and a ring gear 40 engaged with planet gears. In one embodiment, sun gear 34 can be centrally located and engaged to four planet gears 36 positioned equidistantly about sun gear 34. Carrier gear 38 can be connected to each of the planet gears to rotate as planet gears revolve about sun gear 34. Ring gear 40 can be engaged to and surround planet gears 38.

Planetary gear set 32 can connect to input or pinion shaft 24 in several ways to provide different gear ratios. In the embodiment shown in FIGS. 2 and 3, and described above, planetary carrier gear 38 can be rotatably connected to input pinion shaft 24. Universal joint 42 can be rotatably connected to the sun gear 34 via shaft 35 on the side of the planetary gear set 32 opposite to carrier gear 38. Ring gear 40 can be fixed to gear box housing 28 to prevent rotation of ring gear 40. Opposite end of universal joint 42 can be connected to the drive shaft or rotor 54 of the electric motor 52 by known methods.

Figure 8:
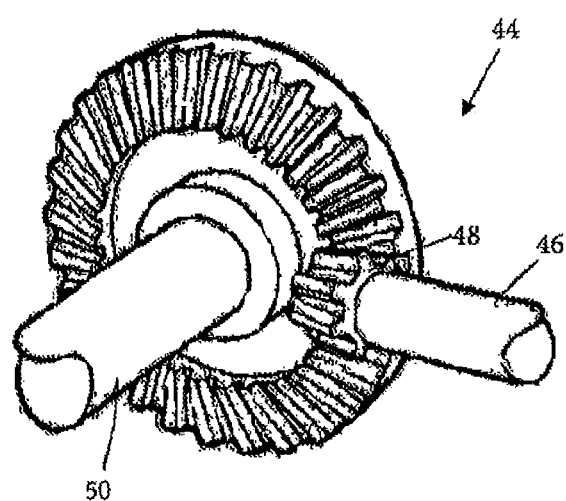
FIG. 8 is a perspective view of a bevel gear set for attachment to an input pinion shaft according to the present disclosure.

In another embodiment, gear set 26 can be a bevel gear set. Bevel gear set can have many different gear sizes and configurations depending on the desired gear ratio. One embodiment of bevel gear set 44 is shown in FIG. 8. Pinion shaft 46 having a bevel gear 48 can connect the rotor 54 of the electric motor 52 and shaft 50 can connect to input pinion shaft 24 of differential 15. Bevel gear set 44 can be housed in the gear box 22 having attachment members 30 for mounting to the exterior of the axle housing 12 as discussed above with respect mounting of planetary gear set 32.

While this invention has been described with reference to illustrative embodiments, it will be understood that this description shall not be construed in a limiting sense. Rather, various changes and modifications can be made to the illustrative embodiments without departing from the true spirit and scope of the invention, as defined by the following claims. Furthermore, it will be appreciated that any such changes and modifications would be recognized by those skilled in the art as an equivalent to one or more elements recited in the following claims, and shall be covered by such claims to the fullest extent permitted by law.

The invention claimed is:

1. An axle assembly having an axle housing for a vehicle comprising:
    a differential assembly including an input pinion shaft, a ring gear engaged with the pinion shaft;
    a gear set, one of the gears of the gear set connected to the pinion shaft and another gear of the gear set connected to a rotor of an electric motor to transmit rotational drive from the rotor of the electric motor to the pinion shaft; and
    a gear box housing the gear set and mounted to an outer surface of a head assembly portion on the axle housing of the axle assembly, wherein the gear box is bolted to existing bolt holes positioned on the head assembly portion of the axle housing, and wherein the rotor of the electric motor and the pinion shaft are axially aligned.

2. The axle assembly of claim 1 wherein the gear set is a planetary gear set including a sun gear engaged to planet gears, a carrier connected to each of the planet gears and a ring gear engaged with the at least two planet gears.

3. The axle assembly of claim 2 wherein the rotor is connected to the sun gear of the planetary gear set, the carrier is connected to the planet gears and an output of the carrier is connected to the input pinion shaft, the ring gear is fixedly attached to an interior of the gear box and wherein the rotor of the electric motor provides rotation drive to the input shaft via the sun gear, planet gears, and carrier.

4. The axle assembly of claim 3 wherein the gear ratio of the gear set is from about 10:1 to about 70:1.

5. The axle assembly of claim 3 wherein the overall gear ratio of axle assembly including the gear set and differential is from about 2:1 to about 40:1.

6. The axle assembly of claim 5 wherein the overall gear ratio of axle assembly including the gear set and differential is from about 7:1 to about 25:1.

7. The axle assembly of claim 1 wherein the gear set is a bevel gear set.

8. The axle assembly of claim 1 wherein the gear box is mounted to the head assembly portion by bolting the gear box to bolt holes of an input cover of the head assembly portion.

9. A gear box for attachment to the outside of the housing of an axle assembly and connection to an input pinion shaft of the differential, the gear box comprising:
    a gear set having a plurality of gears, one of the plurality of gears connected to a drive shaft of an electric motor and another gear of the gear set connected to the input pinion shaft of a differential to transmit rotational drive from the drive shaft of the electric motor to the input pinion shaft of the differential; and
    a gear box housing surrounding the gear set and mounted to an outer surface of a head assembly portion of the axle assembly by bolting the gear box housing to existing bolt holes positioned on the head assembly portion.

10. The gear box of claim 9 wherein the gear set is a planetary gear set including a sun gear engaged to planet gears, a carrier gear connected to each of the planet gears and a ring gear engaged with the at least two planet gears.

11. The gear box of claim 10 wherein the drive shaft is connected to the sun gear of the planetary gear set, the carrier is connected to the planet gears and an output of the carrier is connected to the input pinion shaft, the ring gear is fixedly attached to an interior of the gear box and wherein the drive shaft of the electric motor provides rotation drive to the input shaft via the sun gear, planet gears, and carrier.

12. The gear box of claim 11 wherein the gear ratio of the gear set is from about 10:1 to about 70:1.

13. The gear box of claim 11 wherein the overall gear ratio of axle assembly including the gear set and differential is from about 2:1 to about 40:1.

14. The gear box of claim 13 wherein the overall gear ratio of axle assembly including the gear set and differential is from about 7:1 to about 25:1.

15. The gear box of claim 11, wherein the connection between the drive shaft of the electric motor and the sun gear is axially aligned with the connection between the carrier gear and input pinion shaft.

16. The gear box of claim 9 wherein the gear set is a bevel gear set.

17. A method of modifying an axle assembly having a differential including an input pinion shaft for use with an electric motor having a drive shaft comprising:
    attaching a gear box housing a planetary gear set to an outer surface of a head assembly portion of the axle assembly;
    connecting a sun gear of the planetary gear set on one side thereof to the drive shaft of the electric motor, the sun gear rotationally engaged to two or more planet gears;
    connecting the carrier of the planetary gear set on an opposite side thereof to an input pinion shaft of the axle assembly, the carrier connected to the two or more planet gears of the planetary gear set; and
    fixedly connecting a ring gear of the planetary gear set to an interior of the gear box, the ring gear engagingly connected to the two or more planet gears.

18. The method of modifying an axle assembly of claim 17, wherein the gear box is attached to the outer surface of the head assembly portion by bolting the gear box to existing bolt holes of the head assembly housing, wherein the gearbox provides an overall gear ratio including the differential of from about 2:1 to about 40:1.

* * * * *